(12) United States Patent
Seabron (10) Patent No.: US 6,248,068 B1
(45) Date of Patent: Jun. 19, 2001

(54) ULTRASONIC MONITOR

(76) Inventor: Zeyn Seabron, 17601 Hamilton Rd., Detroit, MI (US) 48203

( * ) Notice: Subject to any disclaimer, the term of this patent is extended or adjusted under 35 U.S.C. 154(b) by 0 days.

(21) Appl. No.: 09/498,129

(22) Filed: Feb. 3, 2000

(51) Int. Cl.$^7$ ....................................................... A61B 8/00
(52) U.S. Cl. ............................................................. 600/437
(58) Field of Search ..................................... 600/437, 438, 600/529, 534; 128/718

(56) References Cited

U.S. PATENT DOCUMENTS

| | | |
|---|---|---|
| 3,693,590 | 9/1972 | Bowers . |
| 3,803,571 | 4/1974 | Luz . |
| 3,942,513 | 3/1976 | Frank . |
| 3,987,427 * | 10/1976 | Clift ....................................... 340/258 |
| 4,035,798 * | 7/1977 | Hackett ..................................... 343/5 |
| 4,107,659 | 8/1978 | Massa . |
| 4,122,427 * | 10/1978 | Karsh ..................................... 600/437 |
| 4,197,856 | 4/1980 | Northrop . |
| 4,399,703 | 8/1983 | Matzuk . |
| 4,574,734 | 3/1986 | Mandalaywala et al. . |
| 4,819,652 | 4/1989 | Micco . |
| 5,455,588 | 10/1995 | Lew et al. . |
| 5,638,824 * | 6/1997 | Summers ............................... 600/437 |
| 5,915,332 | 6/1999 | Young et al. . |

* cited by examiner

Primary Examiner—Marvin M. Lateef
Assistant Examiner—Maulin Patel
(74) Attorney, Agent, or Firm—Dykema Gossett PLLC (57) ABSTRACT

An apparatus is disclosed for the non-contact monitoring of the movement of a person and includes an electrical reference signal generator, an ultrasonic transmitter and an ultrasonic receiver. A preliminary amplifier is coupled to the electronic receiver to receive and to amplify the electrical signal supplied by the ultrasonic receiver and to form an amplified electrical signal of increased amplitude. In order to improve the sensitivity of the apparatus, first and second electrical circuits are provided, with each circuit introducing its own phase shift to the amplified signal from the preliminary amplifier. The total phase shift between the first and second amplified signals is equal to 90°. The apparatus further includes an alarm circuit and a summer circuit or adder which is connected to the electrical circuits and to the alarm circuit. The summer circuit adds the direct current voltages produced by the first and second electrical circuits and amplifies the results. If the amplified signal from the summer circuit is below a preset voltage, it is effective to actuate the alarm circuit which indicates that the movement of the person has terminated. When the amplified signal from the summer circuit produces an output voltage greater than the preset voltage, it maintains the alarm circuit inactive thereby indicating that movement of the person has not terminated.

28 Claims, 6 Drawing Sheets

ULTRASONIC MONITOR

BACKGROUND OF THE INVENTION

1. Field of the Invention

This invention relates to ultrasonic monitors and is primarily concerned with ultrasonic movement monitors such as a monitor or apparatus for monitoring breathing movement of a subject, which may be a human being or an animal. However, the invention also has utility in other fields where it is necessary to exclude certain movements and to detect other movements.

2. Description of the Prior Art

It has been heretofore proposed to monitor the breathing of an infant by monitoring ultrasonic waves reflected from the body of the infant, in order to detect the cessation of respiration. An alarm system is initiated when breathing has ceased, to call the parent or a nurse in a hospital so that immediate and urgent attention can be provided to the infant. One such system is U.S. Pat. No. 4,197,856 which issued on Apr. 15, 1980 to Robert B. Northrop entitled "Ultrasonic Respiration/Convulsion Monitoring Apparatus and Method for Its Use". The system utilizes a continuous ultrasonic wave and a phase-locked-loop is provided whereby the frequency of the ultrasonic source is varied. The analog output signal of the phase-locked-loop represents the movement of the object or person in the time domain.

U.S. Pat. No. 4,738,266 dated Apr. 19, 1988 issued to John B. Thatcher and is entitled "Apnea Monitor". The patent indicates that the exhaled breath of an infant is collected in a hood. A source of infrared energy emits infrared energy into the hood. So long as the infant is breathing, the carbon dioxide in its breath absorbs a portion of the infrared energy in the hood. Should the infant stop breathing, an infrared detector responds to the resulting increase in infrared energy to activate an alarm so as to enable the attendant personnel to take appropriate action.

U.S. Pat. No. 5,638,824 issued on Jun. 17, 1997 to Jonathon Brian Summers and is entitled "Ultrasonic Monitor". The monitor operates by periodically emitting burst of ultrasonic pulses from an emitter and subsequently detecting the pulses by a receiver, for example, after reflection from an object such as a sleeping infant. Changes in conditions are determined by monitoring the changes in phase occurring between the input to the emitter and the output from the receiver While some of the prior art devices referred to previously utilize the same principle of synchronous detection that is in monitoring changes in the reflected signal with respect to the emitted signal, the present invention is arranged as a lock-in amplifier and processes analog signals only. This results in a possibility of measuring not only changes in the phase shift between the two signals, as provided in U.S. Pat. No. 4,197,856, U.S. Pat. No. 5,638,824 and U.S. Pat. No. 5,915,322, but also changes in the amplitude of the reflected signal, which the other devices do not utilize. This makes the overall sensitivity of the present invention higher. The additional measurement does not require any additional hardware and is done simultaneously with the measurement of the phase shift by the multiplication of the two signals with just one analog multiplier integrated circuit.

SUMMARY OF THE INVENTION

It is a feature of the present invention to utilize a second measuring channel, which increases the apparatus' sensitivity and makes it nearly independent of such random external factors as the distance between the apparatus and the infant or object and their mutual orientations.

Still another feature of the present invention is to provide a novel apparatus to reliably and accurately monitor movement and lack of movement, including respiratory movement of a subject and to sound an alarm when conditions warrant.

A further feature of the present invention to provide a non-contact monitoring apparatus for monitoring movements of infants or other subjects, which does not require physical contact with the subject or person.

A still further feature of the present invention is to provide a novel non-contact monitoring device or apparatus providing a motion monitor which will respond to lack of movement in the subject or person by sounding an alarm or buzzer.

Another feature of the present invention to provide a novel apparatus and method for monitoring the degree of respiratory effort and optionally other movements of the infant or subject by reflecting ultrasonic waves from the body of the infant or subject to be monitored.

In accordance with the present invention, there is provided an apparatus for the non-contact monitoring of a person having an ultrasonic means or generator for generating an electrical reference signal and an ultrasonic transmitter coupled to the generator to receive and to convert the electrical reference signal into an ultrasonic emitted wave and to direct the emitted wave towards the body of the person to be monitored, the emitted wave striking the body and being reflected therefrom to form a reflected ultrasonic wave. An ultrasonic receiver is located in a position to receive the reflected ultrasonic wave and to convert the reflected ultrasonic wave into an electric signal of the same frequency as the reflected wave. A preliminary amplifier is coupled to the ultrasonic receiver to receive and to amplify the electric signal supplied by the ultrasonic receiver and to form an amplified electric signal of increased amplitude. A first electrical circuit forming a first channel is coupled to the generator for receiving the electrical reference signal and is also coupled to the preliminary amplifier for receiving and processing the amplified electric signal from the preliminary amplifier. The first circuit introduces a phase shift of 45° to the amplified electric signal from the preliminary amplifier to provide a first shifted amplified signal. The first circuit includes means for multiplying the first shifted amplified signal by the electrical reference signal supplied by the generator. A second electrical circuit is also provided for forming a second channel coupled to the generator for receiving the electrical reference signal and is also coupled to the preliminary amplifier for receiving and processing the amplified signal from the preliminary amplifier. The second electrical circuit introduces a phase shift of negative 45° to the amplified signal from the preliminary amplifier to provide a second shifted amplified signal, with the total phase shift between the first and second shifted amplified signals being equal to 90° and their amplitude being the same. The second circuit includes means for multiplying the second shifted amplified signal by the electrical reference signal supplied to the generator. The apparatus further includes an alarm circuit and a summer circuit or adder which is connected to the first and second electrical circuits and to the alarm circuit. The adder includes means for adding the direct current voltages produced by the first and second electrical circuits and amplifying the result. When the amplified signal from the adder is below a preset voltage, the alarm circuit is activated thereby indicating that the movement of the person has terminated. When the amplified signal from the adder is greater than the preset voltage maintaining the alarm circuit inactive thereby indicating that the movement of the person has not terminated.

In accordance with one aspect of the invention, the apparatus utilizes a standard quartz-crystal-locked generator whose frequency is always constant.

In accordance with another aspect of the present invention, the apparatus contains an analog lock-in amplifier (or synchronous detector) consisting of an analog multiplier and integrator that generates an electric signal proportional to changes at both phase and amplitude of the reflected wave.

In accordance with still another aspect of the present invention, the monitoring apparatus utilizes a second measuring channel, which increases the device sensitivity and makes it nearly independent of such random external factors as the distance between the apparatus and the infant or person and their mutual orientation.

Finally, the monitoring apparatus of the present invention emits a continuous ultrasonic wave; deals with analog signals; and measures both the phase shift and change in amplitude between the emitted and reflected signals, thereby increasing sensitivity.

THEORY OF THE INVENTION

The device or apparatus is intended for the non-invasive monitoring of the breathing of an infant. The device continuously emits ultrasonic waves with the frequency of 40 kHz and receives the signal reflected from the infant's body. The device's operation is based on the principle of lock-in amplification that allows monitoring the phase shift between the reflected and emitted signals as well as the amplitude of the reflected signal with a very high sensitivity. A change in the phase and amplitude of the reflected signal is caused by a cyclic change in the position of the infant's body with respect to the receiver when an infant is breathing in and out or moves in any other way.

The principle of the device's operation can be illustrated as follows. Let us suppose the electric signal fed to the ultrasonic transmitter to be described by the following time-dependent function $$U_{em}(t) A \sin \omega t, \quad (1)$$

where $\omega = 2\pi f_u$ is the ultrasonic frequency, and A is the amplitude of the electric signal supplied to the transmitter. In our device $f_u = 40$ kHz. This signal hereinafter is referred to as the reference. Then, the electric signal on the receiver's output is $$U_r(t) = B \sin(\omega t + \phi), \quad (2)$$

where the amplitude B and phase shift $\phi$ are slow quasi-periodic functions of time, their period being determined by the respiratory rate that is about 0.3–1 Hz, and their amplitudes being determined by the respiratory depth. If, for some reason, the infant stops breathing, B and $\phi$ become constants. That is the time when the device energizes the alarm.

To monitor very slow and weak variations of B and $\phi$, we have used the principle of lock-in amplification with the emitted signal being a reference. The signals described by Eqs. 1 and 2 are supplied to an analogous multiplier that produces their product so that $$U_{mult}(t) = AB\sin\omega t \sin(\omega t + \varphi) = \frac{AB}{2}[\cos\varphi - \cos(2\omega t + \varphi)]. \quad (3)$$

The final expression in Eq. 3 consists of two parts. The first part contains the useful information about the amplitude and phase of the reflected signal, and the other part is a rapidly oscillating function that needs to be eliminated. This can be done by having the signal described by Eq. 3 pass through an integrator with its time constant $\tau$ being much greater than $\omega^{-1}$. Then, the signal on the integrator's output is $$U_{int}(t) = \quad (4)$$

$$\frac{AB}{2\tau}\int_0^1 [\cos\varphi - \cos(2\omega t + \varphi)]dt = \frac{AB}{2}\left[\frac{t}{\tau}\cos\varphi - \frac{1}{2\omega\tau}\sin(2\omega t + \varphi)\right].$$

Figure 8:
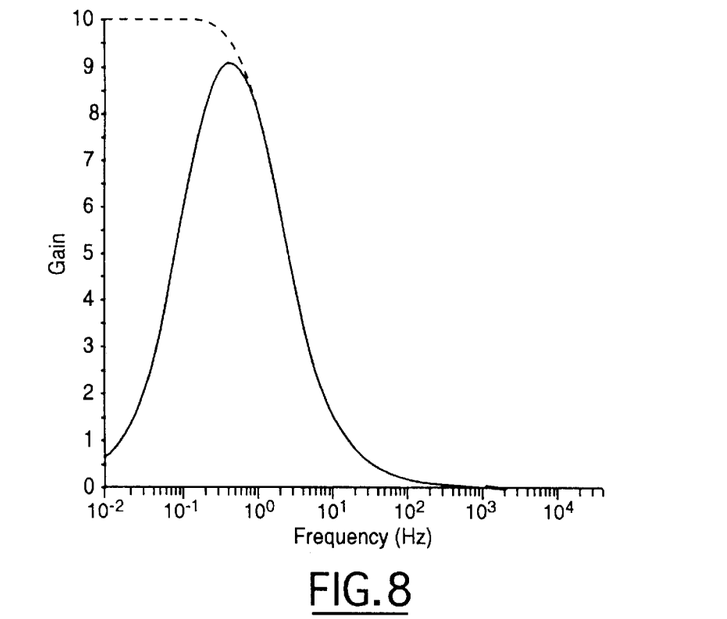
FIG. 8 is a graph showing the frequency characteristics of an active low-pass (dash line) and a band-pass (solid line) filters.

The second term in the final expression of Eq. 4 is negligibly small since $\omega\tau \gg 1$, while the first term, generally speaking, grows indefinitely as t increases. In reality, the growth of the first term is restricted by the design of the integrator that in the present invention is implemented as an active low-pass filter formed by R2, C2, R3, and general-purpose operational amplifier LM324 (OA1A in FIG. 4). The frequency characteristic of the filter is depicted in FIG. 8 with a dashed line. The low-frequency gain G is equal to 10, which is provided by the ratio of R3/R2 (see FIG. 4). So the signal on the integrator output is $$U_{int}(t) = \frac{AB}{2} G\cos\varphi. \quad (5)$$

The important thing is that any time dependence, the signal described by Eq. 5 has, is encapsulated in B and $\phi$ that are slow functions of time, and contains the useful information about the respiratory rate and depth. So the main advantage of the lock-in amplifier is the possibility to receive and process the reflected signal in the high-frequency range where the flicker noise (proportional to $\omega^{-1}$) is small. At the same time, the procedure of integration over the time interval of the order of $\tau$ actually defines the receiver bandwidth $\Delta f$ that is $\Delta f=(2\pi\tau)^{-1}=(2\pi R2 \times C2)^{-1}=1.6$ Hz. Such a narrow bandwidth allows us to get rid of the white noise whose spectral density is evenly distributed over the frequency range. These facts are what makes the lock-in amplification so sensitive to weak variations of the reflected signal.

One more important advantage of the approach is that the receiver is not sensitive to external electromagnetic hindrances. Those hindrances are always present in the reflected signal and originate basically from the activity of various electromagnetic devices like TV and radio stations, cordless and cellular phones, etc. However, since in our circuit the emitted and reflected signals are multiplied and eventually integrated, the hindrances are canceled out due to their being non-synchronous with the emitted signal.

Lock-In Amplification as Applied in the Theory of the Invention

The major difference between the present invention and that of existing ultrasonic motion detectors is the principle of lock-in amplification (synchronous detection) that allows the highest sensitivity possible. Basically, any active measuring device consists of a generator, that produces a probing AC electric signal, and a receiving channel that receives and processes a signal arising due to the interaction of the probing signal with the object. It is the design of the receiving channel that determines the sensitivity of the whole device.

There are three major sources of uncontrollable hindrances that could diminish the device sensitivity: (1) white noise; (2) flicker noise; and (3) external electromagnetic hindrances. The first two sources are a fundamental property of nature. Actually, these noises arise in any electric circuit as completely random and chaotic signals that interferes with the useful signal coming from the object under investigation. If the useful signal is quite small (precision measurements) it could be completely lost on the noise background.

The amplitude of white noise is constant at the whole frequency range. This means that no matter what the frequency of the probing signal and, therefore, of the useful one is, white noise interferes with the useful signal equally. The only way to suppress white noise and to increase the so-called signal-to-noise ratio (SNR) is making the useful signal pass through an averaging circuit or a low-pass filter. This circuit accumulates the mixture of the useful signal and noise and produces a DC voltage whose value is proportional to the amplitude of the useful signal and the accumulation time. Fortunately, due to the chaotic nature of white noise, its amplitude grows much slower during the accumulation. It can be shown that SNR increases as the square root of accumulation time. So if the signal is accumulated (averaged) for a sufficiently long time, white noise can be eliminated.

However, this procedure does not allow getting rid of flicker noise. In contrast to white noise, it is not distributed evenly throughout the frequency range, its amplitude being inversely proportional to the frequency. This means that flicker noise interferes with the useful signal mostly at low frequencies and especially at zero frequency (DC voltage). By applying the averaging procedure the useful high-frequency signal is transformed to a DC voltage, which makes flicker noise grow. This is why direct monitoring of the DC voltage is not suitable for precision measurements. The physical reason for this method's low sensitivity is the loss of such information that is contained in the useful signal as its frequency, phase, and waveform.

The third source of hindrances is related to parasitic uncontrollable variations of the amplitude and waveform of the received signal. These variations that are produced by external electromagnetic sources like cellular and cordless phones, radio and TV stations, and, actually, any electric devices, are going to interfere with the useful signal and, ultimately, with the DC voltage. The important thing is that these hindrances can not be eliminated by the averaging procedure because they are regular in contrast to white and flicker noises.

Considering the design of motion detectors, the DC voltage produced by the averaging circuit is supposed to be a constant if the object does not move. If the object does move, the DC voltage is going to vary indicating changes in the object's position. These voltage variations are caused by changes in either amplitude of the received signal, or its phase, or both. Then the constant voltage is assigned to be the zero level, all the variations being counted from it. However, the sensitivity of this method is low because the zero level is not stable. It is going to vary itself due to flicker noise and the external hindrances. Therefore, movements of the object are only seen as actual movements if they cause greater changes in the DC voltage than the parasitic variations of the zero level. This is the reason why existing motion detectors fail to distinguish such weak and slow movements as those of a sleeping infant breathing in and out.

In order to increase the sensitivity of an ultrasonic motion detector lock-in amplification is utilized. The main feature of lock-in amplification is that the received signal is compared with the probing one supplied from the generator (reference signal) rather than with the received signal from the object when it is supposed to remain still (the zero level). The comparison is done by multiplying the reference and received signals, which produces a signal consisting of two portions. The first one is a rapidly oscillating AC voltage with a frequency being twice as much as that of the reference. The other portion is a DC voltage that contains the useful information about the object. Then the signal passes through an averaging circuit that eliminates both the rapidly oscillating AC voltage and white noise.

The benefit of this method is two-fold. First, in contrast to the existing motion detectors, the DC voltage that indicates the state of the object arises as a result of multiplication before the averaging circuit rather than after it. This actually means that the received signal is processed at its own high frequency where flicker noise is negligible. The second advantage of lock-in amplification is related to the fact that all the external hindrances are going to be eliminated because they are not synchronous with the probing signal and contribute to the rapidly oscillating part of the signal that is eventually removed.

Thus the DC voltage that contains useful information about the object does not contain any parasitic variations. This means that by assigning the zero level in the same way as before, it is made more stable. So all the three sources of hindrances described previously can be effectively suppressed with the use of lock-in amplification.

Figure 9:
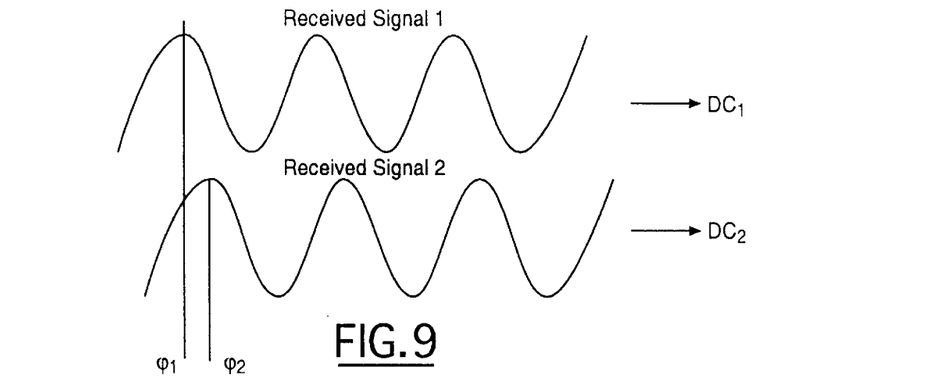
FIG. 9 represents the phase relationship between a pair of signals of an existing motion detector of the prior art.
Figure 10:
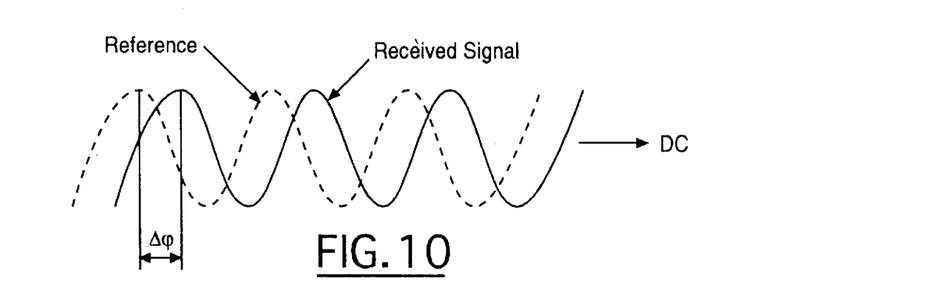
FIG. 10 shows the phase relationship between the reference and received signals of the present invention.

The main difference in the design of the present invention and that of the existing motion detectors can be illustrated through the drawings shown in FIGS. 9 and 10. For simplicity purposes assume that the amplitude of the received signal never changes as the object moves and only the phase varies. Then the existing motion detector that monitors the received signal only works as follows. If the object does not move, the detector receives a signal whose phase is equal to $\phi_1$ (Received Signal 1), averages it and produces a DC voltage ($DC_1$) that depends on $\phi_1$. If the object moves, the phase of the received signal changes and becomes equal to $\phi_2$ (Received Signal 2), which results in a new DC voltage ($DC_2$) on the output of the averaging circuit. These are the variations of $DC_2$ with respect to $DC_1$ that the detector should measure in order to distinguish between movement and lack of movement. The sensitivity of this method is low because of flicker noise and the external electromagnetic hindrances that contribute to the DC voltages and interfere with precise measurements.

At the same time, the amplitude of the received signal might vary during the respiration process. Actually, it does vary unless the infant's body is strictly parallel to the plain of the receiver, which is highly unlikely. In this case, all the advantages of lock-in amplification allow monitoring of the amplitude variations with a high sensitivity.

The present invention allows keeping track of two signals simultaneously (FIG. 10). The lock-in amplifier directly measures the phase shift and/or amplitude variations between the Reference and the Received Signal. In this case, any movement of the object results in the appearance of the DC voltage that is obtained directly from high-frequency measurements. The procedure makes the resulting variations of DC free of flicker noise and external hindrances. This is why the sensitivity of our device is so high that it could monitor the respiration process of a sleeping infant.

With the present invention, false negatives are eliminated by the use of two channels. Neither channel has 100% sensitivity throughout its range. Thus, channel 1 sensitivity is the weakest where channel 2 sensitivity is the greatest. The reverse is also true. Where channel 2 sensitivity is the weakest is where channel 1 sensitivity is the greatest. Therefore, there is an overlap which theoretically eliminates false negatives.

DETAILED DESCRIPTION OF THE PREFERRED EMBODIMENT

Figure 1:
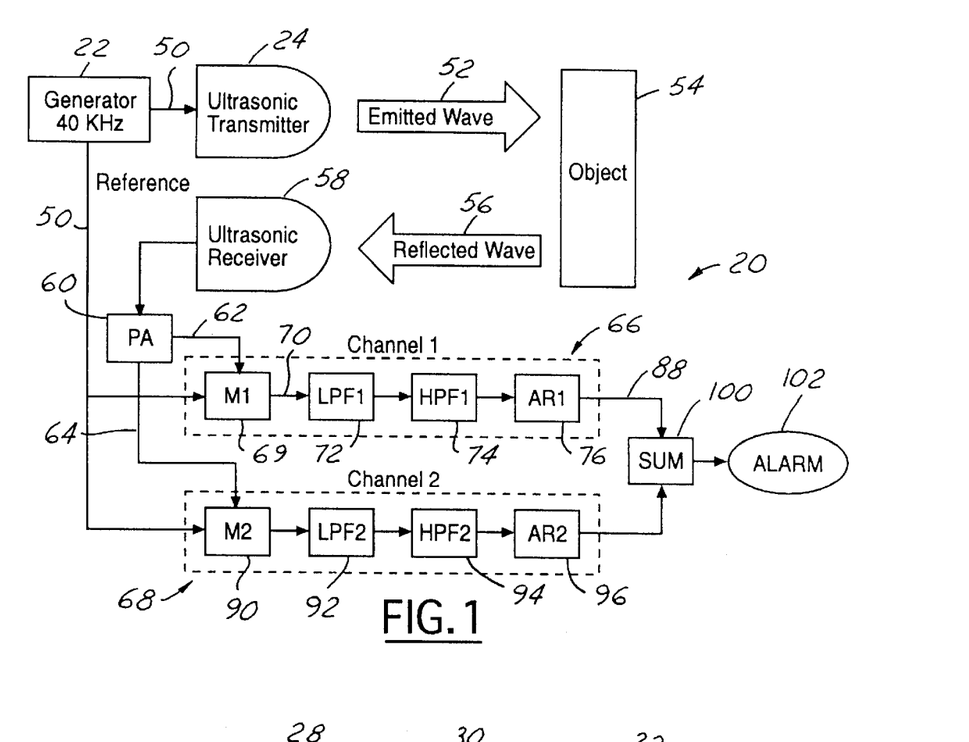
FIG. 1 is a block diagram of the ultrasonic monitor of a preferred embodiment of the present invention.
Figure 2:
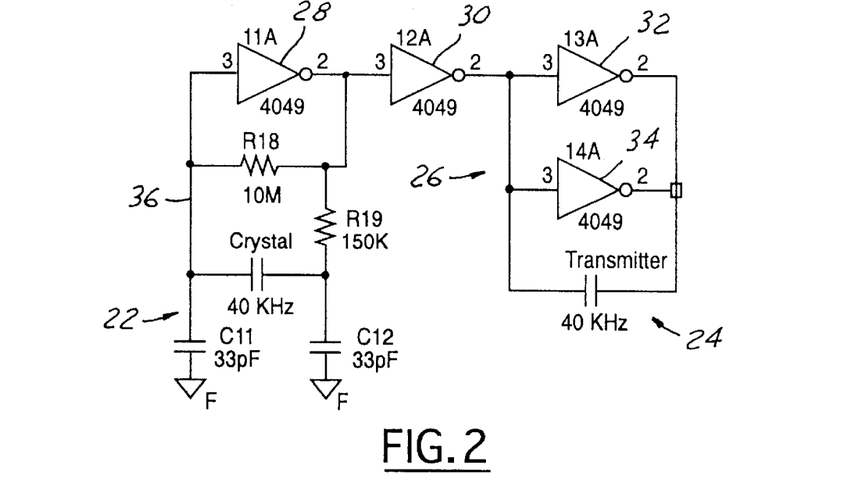
FIG. 2 is an electrical diagram of the ultrasonic transmitter circuit of the present invention.
Figure 3:
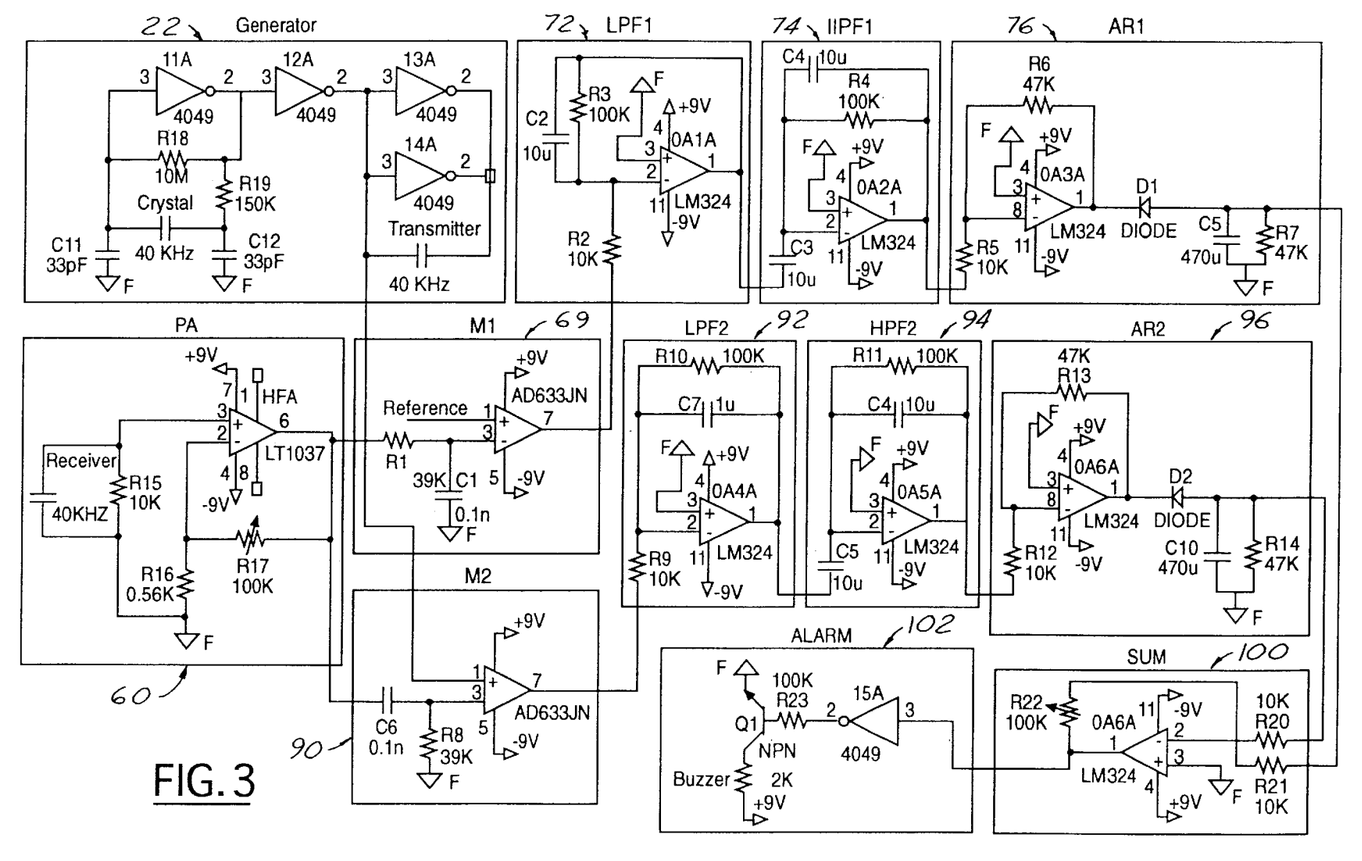
FIG. 3 is a schematic electrical diagram of the ultrasonic monitor illustrating the various component parts of the apparatus.
Figure 6:
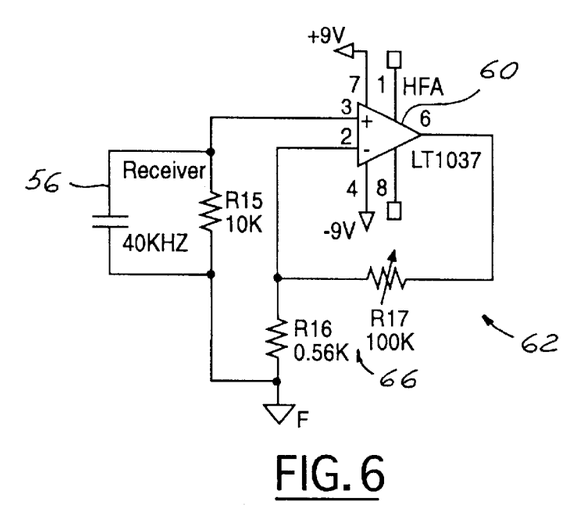
FIG. 6 is an electrical diagram of the preliminary amplifier.

The ultrasonic apparatus of FIG. 1 is designated by the numeral 20 and is designed for the non-contact monitoring of the movement of a person such as an infant resting in a crib. The apparatus 20 consists of a number of components arranged in a circuit to achieve the desired results. The apparatus 20 includes the generator 22 in form of a standard quartz-crystal-locked CMOS inverter oscillator which generates and feeds a 40 kHz square wave to the ultrasonic transmitter 24. The generator 22 is attached to a power supply, not shown, which in turn is attached to an A.C. source. The generator 22 and the transmitter 24 form part of the ultrasonic transmitter circuit 26 illustrated in FIG. 2. The ultrasonic transmitter circuit 26 includes four CMOS inverters 28, 30, 32 and 34 which are encapsulated in a HCF4049UB monolithic integrated circuit 36. The circuit 36 contains six inverting buffers. The buffers feature logic-level conversion using only one positive supply voltage. The ultrasonic transmitter 24 as noted in FIGS. 2 and 3 is coupled to the generator 22 to receive and to convert the electrical reference signal represented by the line 50 (FIG. 1) into an ultrasonic emitted wave 52 and to direct the emitted wave 52 towards the object 54 which, as an example, may be the body of a person to be monitored, an animal or other object to be monitored. The emitted wave strikes the body or object and is reflected therefrom to form a reflected wave 56 (FIG. 1). An ultrasonic receiver 58 is coupled to the preliminary amplifier (PA) 60. The ultrasonic receiver 58 is located in a position to receive the reflected ultrasonic wave 56 and to convert the reflected ultrasonic wave into an electrical signal of the same frequency as the reflected wave. The preliminary amplifier 60 is coupled to the ultrasonic receiver 58 to receive and to amplify the electric signal supplied by the ultrasonic receiver 58 and to form an amplified electric signal of increased amplitude represented by the line 62 and 64. The ultrasonic receiver 58 and preliminary amplifier 60 are located in the preliminary amplifier circuit 62 as set forth in FIG. 6. The purpose of the amplifier circuit 62 is to amplify the electrical signal supplied from the ultrasonic receiver 56 up to the level of several volts. The preliminary amplifier 60 is based on a high-speed operational amplifier LT1037 whose non-inverting input is connected to the receiver 56 with the amplifying feedback loop 66 being arranged through the inverting input of the amplifier 60. The gain of the preliminary amplifier 60 is calculated as $G_{pr}$= 1+R17/R16. The value of amplitude B introduced in Eq. 2 is supposed to be the one after amplification.

The apparatus 20 includes a first electrical circuit 66 forming the first channel or channel 1 and a second electrical circuit 68 forming the second channel or channel 2, as illustrated in FIG. 1.

The first electrical circuit 66 forming the first channel is coupled to the generator 22 for receiving the electrical reference signal 50 and is also coupled to the preliminary amplifier 60 for receiving and processing the amplified signal 62 from the preliminary amplifier 60. The first circuit 66 has a multiplier circuit (M1) 69, that introduces a phase shift of 45° to the amplified electric signal 62 from the preliminary amplifier 60 to provide a first shifted amplified signal 70.

The first electrical circuit 66 further includes a low-pass filter (LPF1) designated by the numeral 72, a high-pass filter 1 (HPF1) designated by the number 74 and an amplitude detector (AR1) designated by the numeral 76. The filters 72 and 74 form a single band-pass filter.

As noted previously, the amplified signal 62 from the preliminary amplifier 60 is supplied to the multiplier circuit 69 where a necessary phase shift in the amount of 45° is introduced. The first circuit 66 including the multiplier circuit 69 includes means for multiplying the first shifted amplified signal 70 by the electrical reference signal 50 supplied by the generator 22. The signal 70 after the multiplier circuit 69 is actually a sum of two signals. The first signal is a rapidly oscillating function of time. It is necessary to eliminate this signal and such is accomplished by means of the low-pass filter 72. The second signal is a slow function of time that is determined by movements of the object or person 54. If the person or infant 54 remains still, the signal is a constant or a DC voltage.

The first electrical circuit 66 future includes in series with the multiplier circuit 69, the low-pass filter 72 and a high-pass filter (HPF1) 74 which form the single band-pass filter. The purpose of filter 74 is to eliminate a DC portion of the signal. This actually means that if the object or person 54 does not move, the output of the high-pass filter is low. If the person or object 54 moves in any way, such as the infant is breathing, then the high-pass filter 74 produces an AC signal, with the frequency of the AC signal being equal to the respiratory rate of the infant, which is of the order of 0.3–1

Hz, and its amplitude is in proportion to the respiratory depth. The resulting AC signal is then supplied to the series connected amplitude detector 76 which amplifies the AC signal and transforms it to a DC voltage which is represented by the arrow 80 in FIG. 1. This DC voltage appears on the output of channel 1 as designated in FIG. 4.

The second electrical circuit 68 includes a multiplier circuit (M2) 90 which is different from the multiplier circuit 69 of the first electrical circuit 80. The multiplier circuit 90 introduces a phase shift of −45° to the amplified signal 64 from the preliminary amplifier 60 to provide a second shifted amplified signal, with the total phase shift between the first and second shifted amplified signals being equal to 90°. The second electrical circuit 68 forming the second channel further includes in series with the multiplier circuit 90 a low-pass filter (LPF2) 92 and a high-pass filter (HPF2) 94 that form a single band-pass filter and an amplitude detector (AR2) 96, the output signal 98 therefrom leading to the summer circuit or adder 100 along with the output signal 80 from the first electrical circuit 66. Low-pass filter 92, high-pass filter 94 and the amplitude detector 96 are identical to the corresponding components in the first electrical circuit 66.

Figure 4:
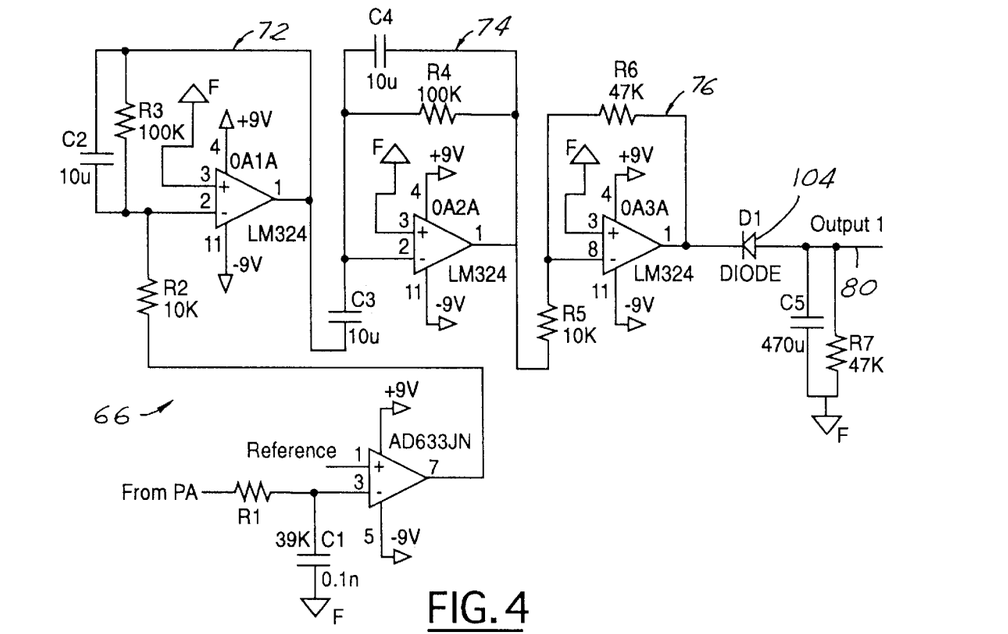
FIG. 4 is an electrical diagram or circuit showing the first channel of the present invention.
Figure 5:
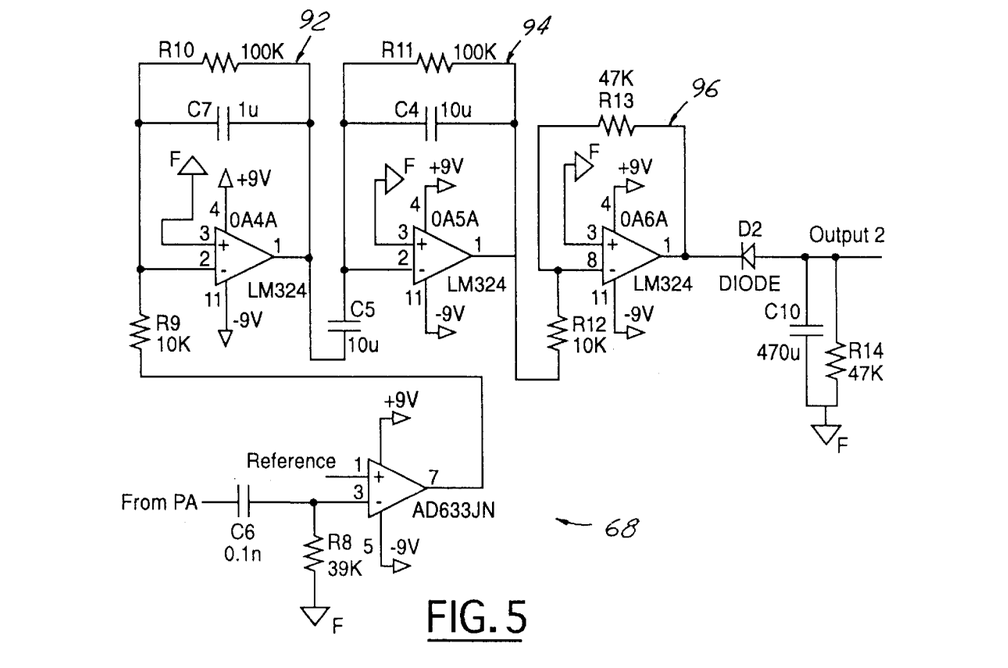
FIG. 5 is an electrical circuit or diagram showing the second channel of the present invention.

As has been determined, the signal, having passed the active low-pass filter 72 contains a parasitic DC part that must be eliminated. This is done with the use of an active high-pass filter 74 formed by C3, C4, R4, and OA2A (FIG. 4). Both low-pass and high-pass filters 72,74 form a single band-pass filter whose frequency characteristics is depicted in FIG. 8 with a solid line 84. The total gain, as shown in FIG. 8, has its maximum at a frequency of about 0.5 Hz that corresponds to the respiration rate of the person being monitored.

Assuming that the amplitude of the reflected signal does not change at respiration and only phase shift ϕ is a function of time so that $$\phi=\phi_o+\delta \sin \Omega t, \quad (6)$$

where $\phi_o$ is a constant determined by the distance to the object 54 and other factors, δ is the amplitude of very small oscillations determined by the respiration depth, and Ω is the respiration rate. Since $\delta<<\phi_o$, the next expression is as follows:

$$\cos \phi = \cos(\phi_o+\delta \sin \Omega t) \approx \cos \phi_o - \sin \phi_o \times \delta \sin \Omega t, \quad (7)$$

The first term in the final expression of Eq. 7 is a constant and is removed by the high-pass filter 74. The remaining part of the signal is amplified with an inverting amplifier 76 formed by R5, R6, and OA3A (FIG. 4), its gain being equal to R6/R5, then rectified by silicon diode (D1) 104 and finally averaged by an integrating circuit formed by C5 and R7. Since the time constant $\tau_{rc}$=RC×C7=22 seconds is much greater than $\Omega^{-1}$, the signal on output 1, designated by the numeral 80, is a negative DC voltage that is equal to $-G_{tot}$ δ|sin $\phi_o$|, where $G_{tot}$ is the total gain of the whole circuit.

The output signal 80 is proportional to δ that is determined by the respiration depth. It means that in the absence of respiration or any other movement there is a low or nearly a zero output, which is going to activate the alarm circuit 102 with a delay of about 20 seconds. But at the same time, the output signal 80 is proportional to |sin $\phi_o$| that is a completely random value varying from zero to unity. This means that the sensitivity of the device 20 would very strongly depend on its distance from the object 54 and other random factors, which is absolutely unacceptable. To overcome this problem, electrical circuit 68 forming the second channel has been added with exactly the same design except for different phase-shifting circuits formed by R1 and C1 in the multiplier circuit 69 of Channel 1 and C6 and R8 in the multiplier circuit 90 of Channel 2 (FIG. 1 and FIG. 3). The circuits 69 and 90 are designed so that R1×C1=C6×R8=ω. In this case, the circuit in Channel 1 introduces a −45° phase shift to the input signal, while the circuit in Channel 2 introduces a 45° phase shift, making the total phase shift between Channels 1 and 2 equal to 90°, their amplitudes of the two shifted signals being the same. Therefore, if the DC voltage on the output signal 80 of Channel 1 is proportional to |sin $\phi_o$|, then the output of Channel 2 is proportional to |cos $\phi_o$|. Finally, both outputs should be added, which causes the resulting DC voltage to be proportional to |sin $\phi_o$|+|cos$\phi_o$|. Of course, it is still a random number, but it could vary within the range from 1 to √2 only, which makes the sensitivity of the device almost independent on the random factors.

However, the situation with the amplitude of the reflected signal being a constant is too idealistic. It can be true only if the infant's body is an exact plain that is parallel to the plain of the receiver. Since it is not so, the amplitude of the reflected signal can vary considerably as the infant is breathing due to changes in the mutual orientation of the body and the receiver. At the same time, since the ultrasonic wavelength is of about 8 mm, and the respiration depth could be less than 1 mm, changes in the phase shift could be quite small.

Suppose that only the amplitude of the reflected signal varies at the respiration. Then, analogously to Eq. (6), it can be written as $$B=B_o+b \sin \Omega t, \quad (8)$$

where b is a small variation of the amplitude. Substituting Eq. 8 into Eq. 5, and having the signal pass through the high-pass filter 74, the value of the DC signal is obtained which is equal to $-G_{tot}$ b|sin $\phi_o$|. As before, the necessity of the second measuring channel 68 is clearly seen because it eliminates the sensitivity's being dependent on the random value of $\phi_o$. At the same time, the sensitivity of the apparatus 20 can be considerably increased due to the monitoring of both phase shift between the emitted and reflected signals and amplitude of the reflected signal.

As mentioned previously, the multiplier circuits 69 and 90 introduce different phase shifts to the signal supplied from the preliminary amplifier 60 so that the total phase shift between the two shifted amplified signals is equal to 90° with their amplitudes being the same. This procedure results in the DC voltage on the output of the amplitude detector 96 being anti-phased with that on the output of the amplitude detector 76 of the first electrical circuit 66. This actually means that if the former signal is low, the later is maximal and vise versa. Then both voltages are added up in the summer circuit or adder 100, which makes the output practically independent of the parasitic random factors. This output voltage can be low or nearly equal to zero only if the infant or object does not move, such as the infant stop breathing, which actuates or energizes the alarm circuit 102 as shown in FIG. 7.

Figure 7:
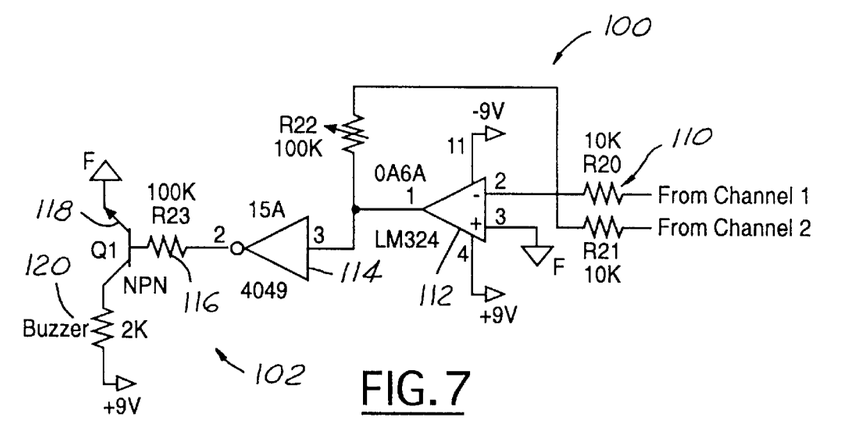
FIG. 7 is an electrical diagram of the summer circuit and of the alarm circuit.

The summer circuit or adder 100 and alarm circuit 102 of FIG. 7 consists of a device 110 for adding the signal outputs from the first and second channels 66,68 along with an amplifier for amplifying the added output signals. The adding device if formed by R20, R21, R22 and operational amplifier (OA6) 112. The sum of the outputs from the first and second channels 66,68 is amplified R22/R21 times by the inverting amplifier 112. The resulting amplified signal is fed to the input of the inverting buffer 114. If the amplifier's output is high, which means that the infant is breathing or moving in any other way, then the output of the inverting buffer 114 stays low or at zero. As a result, there is no current flowing through resistor (R23) 116, transistor (Q1) 118 is closed and the buzzer 120 of the alarm circuit 102 is not energized. If for any reason the respiratory process stops, the output of the amplifier 112 is lowered. As a result thereof the output of buffer 114 increases and activates transistor (Q1) 118 thereby actuating the buzzer 120.

The ultrasonic monitor, when slightly modified, may also be used as an infant respiration monitor. The modified monitor provides the possibility of not only determining if the child has stopped breathing, but also watching whether the respiration rate is within a preset range and sounding an alarm if the breathing becomes too fast or too slow for a time period of more than twenty (20) seconds. According to medical research, such cases of respiratory problems might be the beginning of a pathologic process or even precursors of SIDS and require immediate medical attention. This is why it is important to identify those cases as soon as they get started.

Figure 11:
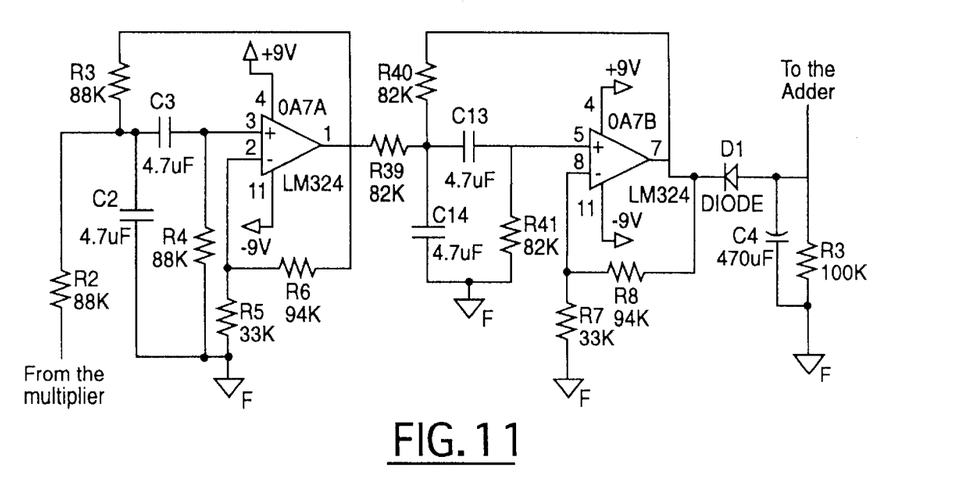
FIG. 11 is a modified electrical diagram or circuit showing first and second channels that allow monitoring of the respiration rate.
Figure 12:
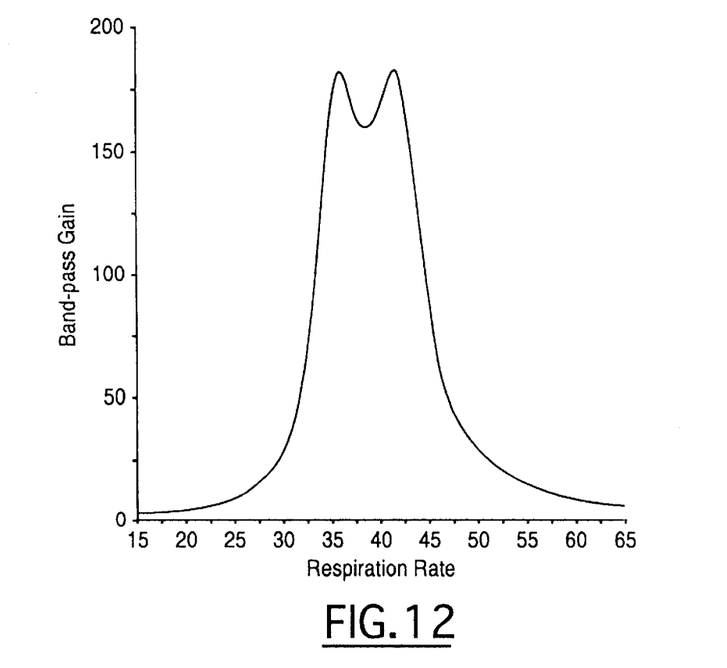
FIG. 12 is a graph showing the frequency characteristics of the modified circuit of FIG. 11.

To make the monitor specific enough to distinguish between the normal and abnormal respiration rates, it is necessary to replace the low-pass and high-pass filters 72, 92 and 74, 94 in both channels 66 and 68 with two Sallen-Key band-pass filters, 124, 126 as it is illustrated in FIG. 11. The frequency characteristics of these filters can be very narrow and even approach the δ-function if R6/R33=R8/R7=3. So if two such filters 124, 126 having slightly different resonance frequencies are connected in series, as it is done in the modified device, then their overall frequency characteristic provides for a very high gain in the preset frequency band and filters out frequencies that are only slightly beyond the band with a very high efficiency. The dependence of the gain on the respiration rate per minute is presented in FIG. 12. As seen, if the respiration rate of an infant goes above 60 or falls below 20, the upper and low boundaries of the normal respiration rate, then the DC voltages on both inputs of the adder 100 go down after a 20-second delay, thereby activating the alarm circuit 120. Obviously, the alarm circuit 120 will be activated if the respiration stops.

The generator 22 includes the six inverting hex buffers, part number, CD4049UBCM sold by Fairchild Semiconductor Corporation of South Portland, Me. 04106 and the 40 kHz cylindrical quarts crystal oscillator, part number C-240.000KC-P sold by Epson Electronics America, Inc. of San Jose, Calif. 95134.

The preliminary amplifier 60 is a high speed operational amplifier, part number LT1037CN8 sold by Linear Technology Corporation of Milpitas, Calif. 95035.

The multiplier circuits 69 and 70 are analog multipliers, part number AD633, sold by Analog Devices of Norwood, Mass. 02062-9106.

The ultrasonic transmitter or emitter 24 is sold as part number EFR-RSB40K5 by Masushita Electric Corporation of American of Secaucus, N.J. 07094.

The ultrasonic receiver 58 is sold as part number EFR-TSB40K5 by Masushita Electric Corporation of America of Secaucus, N.J. 07094.

A low-power quad operational amplifier for electrical circuits 66, 68 and the alarm circuits 102 is sold as part number LM324AN by National Semiconductor Corporation of Santa Clara, Calif. 95052-8090.

Finally, an example of a power supply, not shown, for use with the apparatus 20 is a linear regulated dual output power supply, part number 57DTR-512D-05050 sold by Group West International of Concord, Calif. 94521.

What I claim is:

1. An apparatus for the non-contact monitoring of the movement or non-movement of an object comprising:
    (a) a generator for generating an electrical reference signal;
    (b) an ultrasonic transmitter coupled to said generator to receive and to convert said electrical reference signal into an ultrasonic emitted wave and to direct said emitted wave towards the object to be monitored, the emitted wave striking the object and being reflected therefrom to form a reflected ultrasonic wave;
    (c) an ultrasonic receiver located in a position to receive the reflected ultrasonic wave and to convert the reflected ultrasonic wave into an electric signal of the same frequency as the reflected wave;
    (d) a preliminary amplifier coupled to said ultrasonic receiver to receive and to amplify the electric signal supplied by said ultrasonic receiver and to form an amplified electric signal of increased amplitude;
    (e) a first electrical circuit forming a first channel coupled to said generator for receiving said electrical reference signal and also coupled to said preliminary amplifier for receiving and processing the amplified electric signal from said preliminary amplifier;
    (f) said first circuit introducing a phase shift of 45° to said amplified electric signal from said preliminary amplifier to provide a first shifted amplified signal;
    (g) said first circuit including means for multiplying the first shifted amplified signal by the electrical reference signal supplied by said generator;
    (h) a second electrical circuit forming a second channel coupled to said generator for receiving said electrical reference signal and also coupled to said preliminary amplifier for receiving and processing the amplified signal from said preliminary amplifier;
    (i) said second electrical circuit introducing a phase shift of −45° to said amplified signal from said preliminary amplifier to provide a second shifted amplified signal, with the total phase shift between said first and second shifted amplified signals being equal to 90° and their amplitudes being the same;
    (j) said second circuit including means for multiplying the second shifted amplified signal by the electrical reference signal supplied by said generator;
    (k) an alarm circuit;
    (l) an adder connected to said first and second electrical circuits and to said alarm circuit;
    (m) said adder including means for adding the direct current voltages produced by said first and second electrical circuits and amplifying the result;
    (n) said amplified signal from said adder when the voltage is below a preset voltage actuating said alarm circuit thereby indicating that the movement of the object has terminated;
    (o) said amplified signal from said adder when producing an output voltage greater than said preset voltage maintaining said alarm circuit inactive thereby indicating that movement of the object has not terminated.

2. The apparatus of claim 1 wherein said ultrasonic transmitter is part of an ultrasonic transmitter circuit which includes a standard quartz-crystal locked CMOS inverter oscillator that provides a 40 kHz square wave to said ultrasonic transmitter.

3. The apparatus of claim 1 wherein said preliminary amplifier is part of an electrical amplifier circuit incorporating said ultrasonic receiver, said last mentioned electrical amplifier circuit including a high-speed operational amplifier with its non-inverting input connected to said ultrasonic receiver.

4. The apparatus of claim 1 wherein said first and second channels are independent channels for the processing of the reflected signal having passed said preliminary amplifier.

5. The apparatus of claim 4 wherein each of said first and second channels has a multiplier circuit that introduces its own phase shift and then multiplies the phase-shifted signal by the electrical reference signal supplied by said generator.

6. The apparatus of claim 5 wherein said first channel also includes in series with its multiplier circuit, a low-pass filter and a high-pass filter that form a single band-pass filter and an amplitude detector, the signal after the multiplier circuit being equal to the sum of two signals, with one signal being a rapidly oscillating function of time which is eliminated by said low-pass filter and the second signal that is a slow function of time that is determined by movements of the object.

7. The apparatus of claim 6 wherein said high-pass filter in said first channel eliminates a DC portion of the signal, whereby if the object does not move, the output of the high-pass filter is low, and if the object moves, then the high-pass filter produces an AC output signal with its frequency being equal to that of the object's movement and with its amplitude being proportional to the depth of the movement.

8. The apparatus of claim 7 wherein the alternating current output signal from said high-pass filter of said first channel is supplied to the input of said amplitude detector that amplifies the signal and transforms it into a direct current voltage at the output of said first channel.

9. The apparatus of claim 5 wherein said second channel also includes in series with its multiplier circuit, a low-pass filter and a high-pass filter that form a single band-pass filter and an amplitude detector, the signal after the multiplier circuit being equal to the sum of two signals, with one signal being a rapidly oscillating function of time which is eliminated by said low-pass filter and the second signal that is a slow function of time that is determined by movements of the person.

10. The apparatus of claim 9 wherein said high-pass filter in said second channel eliminates a DC portion of the signal, thus if the person does not move, the output of the high-pass filter is low, and if the person moves, then the high-pass filter produces an AC signal with its frequency being equal to that of the object's movement and with its amplitude being proportional to the depth of the movement.

11. The apparatus of claim 10 wherein the alternating current output signal from said high-pass filter of said second channel is supplied to the input of said amplitude detector that amplifies the signal and transforms it into a direct current voltage at the output of said second channel and which is anti-phased with the direct current voltage at the output of said first channel.

12. The apparatus of claim 11 wherein said adder includes an adding circuit that adds the outputs from said first and second channels and an inverting amplifier that amplifies the added outputs from said channels.

13. The apparatus of claim 12 wherein said alarm circuit includes an inverting buffer connected to the output of said adder and to a transistor and a buzzer whereby when the output from said inverting amplifier is low, the output from said buffer is high thereby activating said transistor and energizing said buzzer.

14. The apparatus of claim 5 wherein said first and second channels each include a pair of band-pass filters.

15. The apparatus of claim 14 wherein said band-pass filters are Sallen-Key filters.

16. An apparatus for the non-contact monitoring of the movement or non-movement of an object or a person comprising:

(a) a generator for generating an electrical reference signal;

(b) an ultrasonic transmitter coupled to said generator to receive and to convert said electrical reference signal into an ultrasonic emitted wave and to direct said emitted wave towards the body of the person or object to be monitored, the emitted wave striking the body or object and being reflected therefrom to form a reflected ultrasonic wave;

(c) an ultrasonic receiver located in a position to receive the reflected ultrasonic wave and to convert the reflected ultrasonic wave into an electric signal of the same frequency as the reflected wave;

(d) a preliminary amplifier coupled to said ultrasonic receiver to receive and to amplify the electric signal supplied by said ultrasonic receiver and to form an amplified electric signal of increased amplitude;

(e) a first electrical circuit forming a first channel coupled to said generator for receiving said electrical reference signal and also coupled to said preliminary amplifier for receiving and processing the amplified electric signal from said preliminary amplifier;

(f) said first circuit introducing a positive phase shift to said amplified electric signal from said preliminary amplifier to provide a first shifted amplified signal;

(g) said first circuit including means for multiplying the first shifted amplified signal by the electrical reference signal supplied by said generator;

(h) a second electrical circuit forming a second channel coupled to said generator for receiving said electrical reference signal and also coupled to said preliminary amplifier for receiving and processing the amplified signal from said preliminary amplifier;

(i) said second electrical circuit introducing a negative phase shift to said amplified signal from said preliminary amplifier to provide a second shifted amplified signal, with the total phase shift between said first and second shifted amplified signals being equal to the sum of the absolute values of said positive and negative phase shifts;

(j) said second circuit including means for multiplying the second shifted amplified signal by the electrical reference signal supplied by said generator;

(k) an alarm circuit;

(l) a summer circuit connected to said first and second electrical circuits and to said alarm circuit;

(m) said summer circuit including means for adding the direct current voltages produced by said first and second electrical circuits and amplifying the result;

(n) said amplified signal from said summer circuit when the voltage is below a preset voltage actuating said alarm circuit thereby indicating that the movement or non-movement of the person or object has terminated;

(o) said amplified signal from said summer circuit when producing an output voltage greater than said preset voltage maintaining said alarm circuit inactive thereby indicating that movement or non-movement of the person or object has not terminated.

17. The apparatus of claim 16 wherein the sum of the absolute values of said positive and negative phase shifts is equal to 90°.

18. The apparatus of claim 16 wherein each of said first and second channels has a multiplier circuit that introduces the phase shift and then multiplies the phase shifted signal by the electrical reference signal supplied by said generator.

19. The apparatus of claim 18 wherein said first channel also includes in series with its multiplier circuit, a low-pass filter and a high-pass filter that form a single band-pass filter and an amplitude detector, the signal after the multiplier circuit being equal to the sum of two signals, with one signal being a rapidly oscillating function of time which is eliminated by said low-pass filter and the second signal that is a slow function of time that is determined by movements of the person.

20. The apparatus of claim 19 wherein said high-pass filter in said first channel eliminates a DC portion of the signal, whereby if the person does not move, the output of the high-pass filter is low, and if the person moves, then the high-pass filter produces an AC output signal with its frequency being equal to that of the person's movement and with its amplitude being proportional to the depth of the movement.

21. The apparatus of claim 20 wherein the alternating current output signal from said high-pass filter of said first channel is supplied to the input of said amplitude detector that amplifies the signal and transforms it into a direct current voltage at the output of said first channel.

22. The apparatus of claim 16 wherein said second channel also includes in series with its multiplier circuit, a low-pass filter and a high-pass filter that form a single band-pass filter and an amplitude detector, the signal after the multiplier circuit being equal to the sum of two signals, with one signal being a rapidly oscillating function of time which is eliminated by said low-pass filter and the second signal that is a slow function of time that is determined by movements of the person or object.

23. The apparatus of claim 22 wherein said high-pass filter in said second channel eliminates a DC portion of the signal, whereby if the person or object does not move, the output of the high-pass filter is low, and if the person moves, then the high-pass filter produces an AC signal with its frequency being equal to that of the movement of the person or object and with its amplitude being proportional to the depth of the movement.

24. The apparatus of claim 23 wherein the alternating current output signal from said high-pass filter of said second channel is supplied to the input of said amplitude detector that amplifies the signal and transforms it into a direct current voltage at the output of said second channel and which is anti-phased with the direct current voltage at the output of said first channel.

25. The apparatus of claim 24 wherein said summer circuit includes an adding circuit that adds the outputs from said first and second channels and an inverting amplifier that amplifies the added outputs from said channels.

26. The apparatus of claim 25 wherein said alarm circuit includes an inverting buffer connected to the output of said summer circuit and to a transistor and a buzzer whereby when the output from said inverting amplifier is low, the output from said buffer is high thereby activating said transistor and energizing said buzzer.

27. The apparatus of claim 18 wherein each of said first and second channels has a multiplier circuit that introduces the phase shift and then multiplies the phase shifted signal by the electrical reference signal supplied by said generator.

28. The apparatus of claim 27 wherein said band-pass filters are Sallen-Key filters.

* * * * *